United States Patent [19]

Dey et al.

[11] 4,450,213
[45] May 22, 1984

[54] CELL HAVING IMPROVED ABUSE RESISTANCE

[75] Inventors: Arabinda N. Dey, Needham; Robert W. Holmes, Arlington, both of Mass.

[73] Assignee: Duracell Inc., Bethel, Conn.

[21] Appl. No.: 339,819

[22] Filed: Jan. 18, 1982

[51] Int. Cl.³ .............................................. H01M 4/36
[52] U.S. Cl. .................................. 429/105; 429/196; 429/194; 29/623.1
[58] Field of Search ............... 429/101, 105, 191, 194, 429/196; 29/623.1

[56] References Cited

U.S. PATENT DOCUMENTS

| | | | |
|---|---|---|---|
| 4,091,188 | 5/1978 | Dey | 429/194 X |
| 4,184,014 | 1/1980 | Dey | 429/105 |
| 4,262,065 | 4/1981 | Giattino | 429/101 |
| 4,264,690 | 4/1981 | Rao | 429/194 |
| 4,331,745 | 5/1982 | Catanzarite | 429/105 X |
| 4,335,191 | 6/1982 | Peled | 429/105 X |

Primary Examiner—Charles F. LeFevour
Attorney, Agent, or Firm—Ronald S. Cornell; Israel Nissenbaum

[57] ABSTRACT

A non-aqueous cell having a lithium anode is made abuse resistant by sandwiching and enclosing a thin substantially perforation-free copper foil or sheet between layers of lithium whereby the copper is isolated from the cell electrolyte.

9 Claims, 5 Drawing Figures

CELL HAVING IMPROVED ABUSE RESISTANCE

This invention relates to non-aqueous electrochemical cells particularly those subject to damage during cell reversal.

High energy density electrochemical cells, such as those containing as alkali or alkaline earth metal anode and a non-aqueous electrolyte have higher energy densities and produce higher voltages than conventional cells having aqueous electrolytes. Anodes used in many such cells have generally been formed from a layer of alkali or alkaline earth metal alone, or in combination with a backing plate, a wire mesh or a layer of expanded metal. A wire mesh or an expanded metal layer has been generally preferred since such materials add little weight or volume to the anode and permit the anode to be used with a pair of cathodes, one on each side of the anode to increase cell efficiency and capacity. However, many cells using alkali or alkalinae earth metal anodes, due to their more reactive components and higher energy densities can, under certain conditions, when abused be driven into thermal runaway with resultant subsequent internal heating and possible cell damage.

One of the more frequently encountered forms of cell abuse which can cause thermal runaway is cell reversal which can occur when one cell in a group of cells connected in series is completely discharged before the other cells. The remaining cells force current through the discharged cell in the discharging direction with the polarity of the discharged cell being reversed so that the cell has a negative voltage. This reversal in the polarity of the cell electrodes indicates a shift in the chemical reaction within the cell. The forcing of current through the discharged cell causes electrolysis to occur which results in a deposition of alkali or alkaline earth anode metal on the cathode in the form of highly reactive dendrites which may react with other cell components. During cell reversal the cell heats up considerably and if allowed to continue, the build-up of heat within the cell can cause the cell to sustain internal damage such as by rapid reaction of the dendritic alkali or alkaline earth metal.

It is an object of the present invention to provide a method for making non-aqueous electrochemical cells abuse resistant particularly under cell reversal conditions. This and other objects, features and advantages of the present invention will become more evident from the following discussion and drawings in which.

Figure 1:
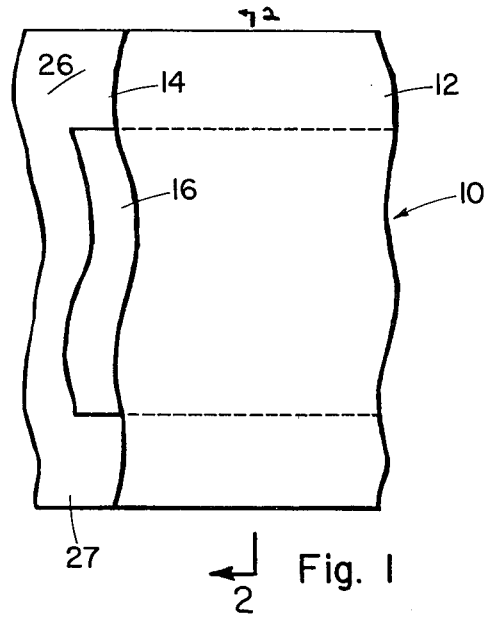
FIG. 1 is a side view of a segment of the anode in accordance with the method of the present invention (with parts cut away for clarity).

Generally the present invention comprises a method for enhancing the abuse resistance of non-aqueous electrochemical cells by sandwiching and enclosing a thin substantially perforation free layer of copper, preferably as a foil, substantially totally within layers of the anode metal such as lithium whereby the copper "insert" is shielded from contact with the cell electrolyte. For enhanced effectiveness it is preferred that the copper "insert" have a surface area at least 25% and preferably more than 40% up to about 80% that of the sandwiching anode metal layers operatively associated with the cathode, i.e. directly facing the cathode.

Thickness of the copper should be at least 5% that of the anode metal and is preferably about 10–20%. Too much copper will, however, reduce anode metal volume and cell capacity. The thickness of the copper insert should thus not exceed 50% of the anode thickness.

Though the use of the copper insert is effective with alkali and alkaline earth metals as anodic materials it is preferred that it be utilized in conjunction with highly reactive and high energy density lithium as the anodic material.

Insertion of the substantially perforation free copper layer within the active metal in the anode is believed to reduce or eliminate the damaging effects of cell reversal through one or more possible mechanisms. First, local hot spots on the anode may be reduced or eliminated as a result of the even distribution of current densities on the anode produced by the presence of the highly conductive copper. In prior art cells the diminished anode area resulting from the consumption of the anode material resulted, upon reversal, in high current densities and hot spots in the remaining portions of the anode still connected to the current collector. Grids, used in some cells as current collectors including some constructed of copper were generally ineffective in preventing such hot spots because of their reduced heat conduction and relatively higher electrical resistance inherent in their perforated structures. In the present invention, the large integral surface area of the perforation free copper layer initially shielded from reaction and still present after the anode metal is substantially consumed provides a large, highly conductive surface area which very rapidly reduces local heating or hot spots on the anode by absorbing heat and distributing it throughout the anode.

This rapid elimination of local areas of high temperature on the anode is believed to reduce the possibility of exothermic reactions being initiated and irrevocably sustained between hot portions of the reactive alkali or alkaline earth metal anode and the electrolyte or among various constituents of the electrolyte near the hot spot. Such exothermic reactions are believed to be at least partially responsible for the increase in internal cell pressures that can lead to possible cell damage with the elimination thereof enhancing cell safety.

A second possible mechanism by which the copper "insert" acts to reduce cell heating during cell reversal is associated with the chemical properties of the copper, i.e. that it is capable of being ionized or dissolved into the electrolyte after anode metal consumption. Accordingly, after the active anode has been substantially consumed during cell discharge and the cell forced into reversal, the copper is ionized at the anode and then deposited onto the cathode. The copper is therefore initially, totally shielded from the cell electrolyte until the anode metal is substantially consumed in order to prevent premature ionization or dissolution of the copper. The dissolution of the copper into the electrolyte during cell reversal therefore reduces cell resistance by providing a chemical reaction outlet for the reversal current and thereby also reducing resistance heating of the cell. Furthermore, deposition of the copper on the cathode is in the form of dendrites which build up to the point where they penetrate the separator (if any) and make short circuiting contact with the anode thereby providing a low resistance and low heat current path through the cell. The deposition of the copper together with the anode metal onto the cathode also inhibits the reactivity of the highly reactive dendritic active anode metal present on the cathode during cell reversal.

Figure 2:
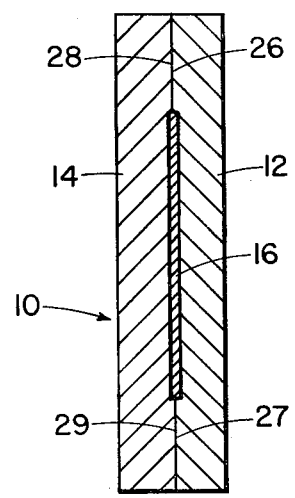
FIG. 2 is a cross-sectional view of the anode of the invention taken on line 2—2 of FIG. 1.
Figure 3:
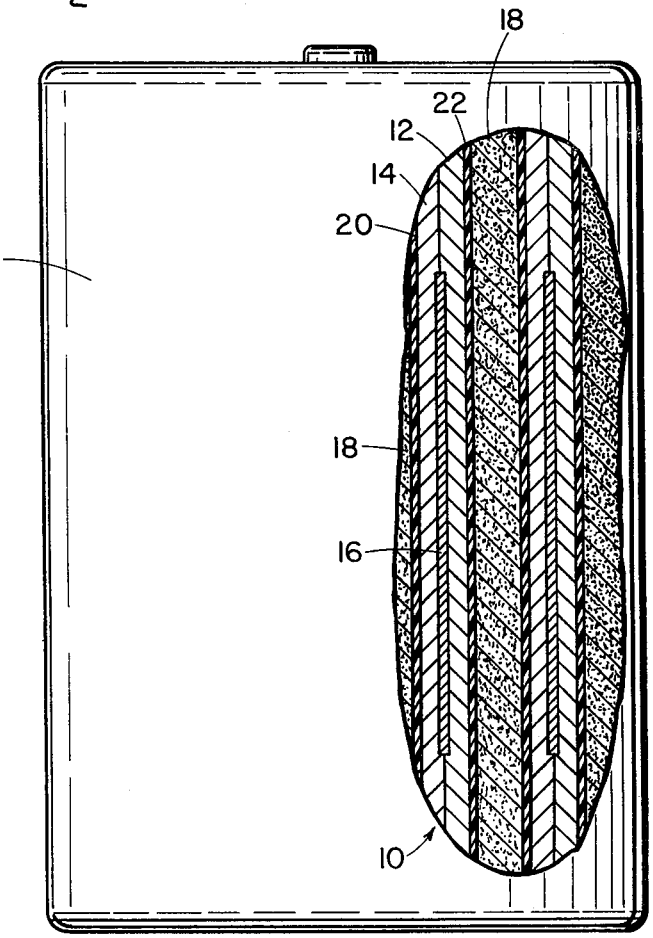
FIG. 3 is a side view of an electrochemical cell made in accordance with the method of the present invention in which a portion of the cell is cut away to show the anode-cathode configuration in cross-section.

Referring now to FIGS. 1 and 2 of the drawings there is shown the preferred anode 10 made in accordance with the present invention of the substantially non porous layers 12 and 14 of an active anode metal such as lithium and a substantially perforation free layer of copper 16 sandwiched therebetween. The anode metal layers 12 and 14 are adhered such as by cold welding of their adjacent surfaces 26 and 27 to fully enclose copper layer 16 therewithin and the anode metal layers 12 and 14 are attached to an anode terminal (not shown). The copper layer 16 is therefore not exposed to the cell electrolyte until all or a substantial portion of the anode metal is consumed. In FIG. 3 the anode 10 with copper insert 16 is shown in place within cell 24. A separator 22, a cathode 18, and another separator 20 are placed adjacent the anode 10 to form the cell 10, with the separators 22 and 20 electrically separating the anode layers 12, 14 from the cathode 18. These layers are shown as convolutely wound into a jelly roll in cell 24.

The separators 22 and 20 are preferably of microporous material inert to the other components of the cell. Useful separators include sintered glass, microporous plastic such as polypropylene, and cellulose. It is preferred that they be of thin dimensions to provide increased volume for active cell components and to be more readily pierceable by the dendritic plate copper under abuse conditions.

The electrolyte employed in the cell is preferably a fluid or liquid depolarizer and electrolyte solvent having an electrolyte solute dissolved therein. Useful liquid depolarizers include sulfur dioxide and thionyl chloride ($SOCl_2$).

With the fluid depolarizers the cathode 18 of the cell is preferably a highly porous carbonaceous material, such as carbon black and/or graphite pressed onto a current collector of an expanded metal such as aluminum, stainless steel or nickel. Solid active cathode materials are also useful and include metal oxides, transition metal chalcogenides, metal halides, and metal chromates.

Non-aqueous inorganic or organic electrolyte salt solvents which do not detrimentally react with the other components of the cell can also be used in the method of the present invention as a cosolvent with the liquid depolarizer. Such organic solvents can include, but are not limited to, the many known solvents such as esters, ethers, aldehydes, ketones, nitriles, and amides. The preferred additional solvent is acetonitrile. Such organic cosolvents may also be used wherein the cathodes are solid active materials. Where an active solid cathode is used, the electrolyte can comprise one or more organic or inorganic solvents, such as those previously disclosed. One or more electrolyte solutes are generally dissolved into the solvent to provide conductivity.

Electrolyte solutes useful with the present invention include Lewis bases having the general formula $A_mB_n$ where A is an element selected from the alkali and alkaline earth metals, and the rare earths, while B is a halogen or oxygen and m and n are determined by the valencies. Useful solutes include lithium bromide and lithium chloride. Other preferred solutes include various Lewis acids preferably containing lithium. The copper layer 16 is ionizable when exposed to the aforementioned non-aqueous electrolytes.

The safety of cells made in accordance with the present invention is graphically illustrated by the following examples. It is understood, however, that such examples are for illustrative purposes and that specifics contained therein are not to be construed as limitations on the present invention. Unless otherwise indicated, all parts are parts by weight.

EXAMPLE 1 (PRIOR ART)

A cell was constructed with a lithium anode $53 \times 4.1 \times 0.02$ cm convolutely wound with a carbonaceous cathode (on an aluminum grid) $50 \times 4.1 \times 0.091$ cm and porous polypropylene separators $66 \times 4.7 \times 0.0025$ cm. The cell was filled with 37 gms of an electrolyte comprised of 71% $SO_2$, 23% acetonitrile and 6% LiBr. The $SO_2$ functioned as both cathode depolarizer and electrolyte solvent. The cell was discharged at $-30°$ C. to exhaustion and driven into reversal to about $-7$ volts and a cell wall temperature of about 108° C. as shown as curves A in FIG. 4 (time-voltage) and FIG. 5 (time-temperature). Though the negative voltage and temperature stabilized thereafter at about $-6.5$ volts and about 72° C. such conditions remained potentially hazardous particularly with cell reversal at higher ambient temperatures.

EXAMPLE 2

A cell is made as in Example 1 but with a copper foil layer, $47 \times 2.5 \times 0.0025$ cm embedded within the lithium anode. The surface area of the copper insert was about 54% that of the lithium and the thickness was about 12.5% that of the lithium.

The cell was discharged to exhaustion and driven to reversal to a stabilized voltage of $-1$ volts and a cell wall temperature of 23° C. (curve B in FIGS. 4 and 5 respectively) which thereafter stabilized at $-21.5°$ C., only 8.5° C. above the ambient temperature.

The relatively small increase in temperature and the final low sustained temperature rise over ambient indicates that no exothermic reactions were occurring with the cell and/or that there was not detrimental resistance heating within the cell. This compares favorably with the high cell wall temperatures occurring during reversal of the prior art in Example 1.

It is understood that the above examples are illustrative only and not meant to limit the invention. Changes may be made in cell construction, componets and cell component ratios without departing from the scope of the present invention as defined in the following claims.

What is claimed is:

1. A method for making a non-aqueous electrochemical cell having improved abuse resistance wherein a cathode, an alkali or alkaline earth metal anode and a fluid non-aqueous electrolyte are placed in operative association within a cell container to make said cell, characterized in that said method comprises the steps of placing and substantially totally enclosing a substantially perforation-free layer of copper within said anode metal prior to placing said anode metal within said cell container and filling said cell container with a fluid non-aqueous electrolyte in which said copper is soluble or ionizable.

2. The method of claim 1 wherein said copper layer has a surface area between 25–80% that of the surface area of said anode which is operatively associated with said cathode.

3. The method of claim 2 wherein said surface area of said copper layer is between 40–80% that of the surface area of said anode operatively associated with said cathode.

4. The method of claims 1 or 2 wherein the thickness of said copper layer is between 5–50% of said anode.

5. The method of claim 1 wherein the thickness of said copper layer is between 10–20% of said anode.

6. The method of claims 1,2,3 or 5 wherein said anode is comprised of lithium.

7. The method of claim 1 wherein said anode is comprised of lithium, said cathode is of an inert carbonaceous material and said electrolyte includes a fluid cathode depolarizer selected from the group consisting of sulfur dioxide and thionyl chloride.

8. The method of claim 7 wherein said copper layer has a surface area between 40–80% that of the lithium anode operatively associated with said carbonaceous cathode.

9. An abuse resistance cell made in accordance with the method of claims 1,7 or 8.

* * * * *

UNITED STATES PATENT AND TRADEMARK OFFICE
CERTIFICATE OF CORRECTION

Figure 4:
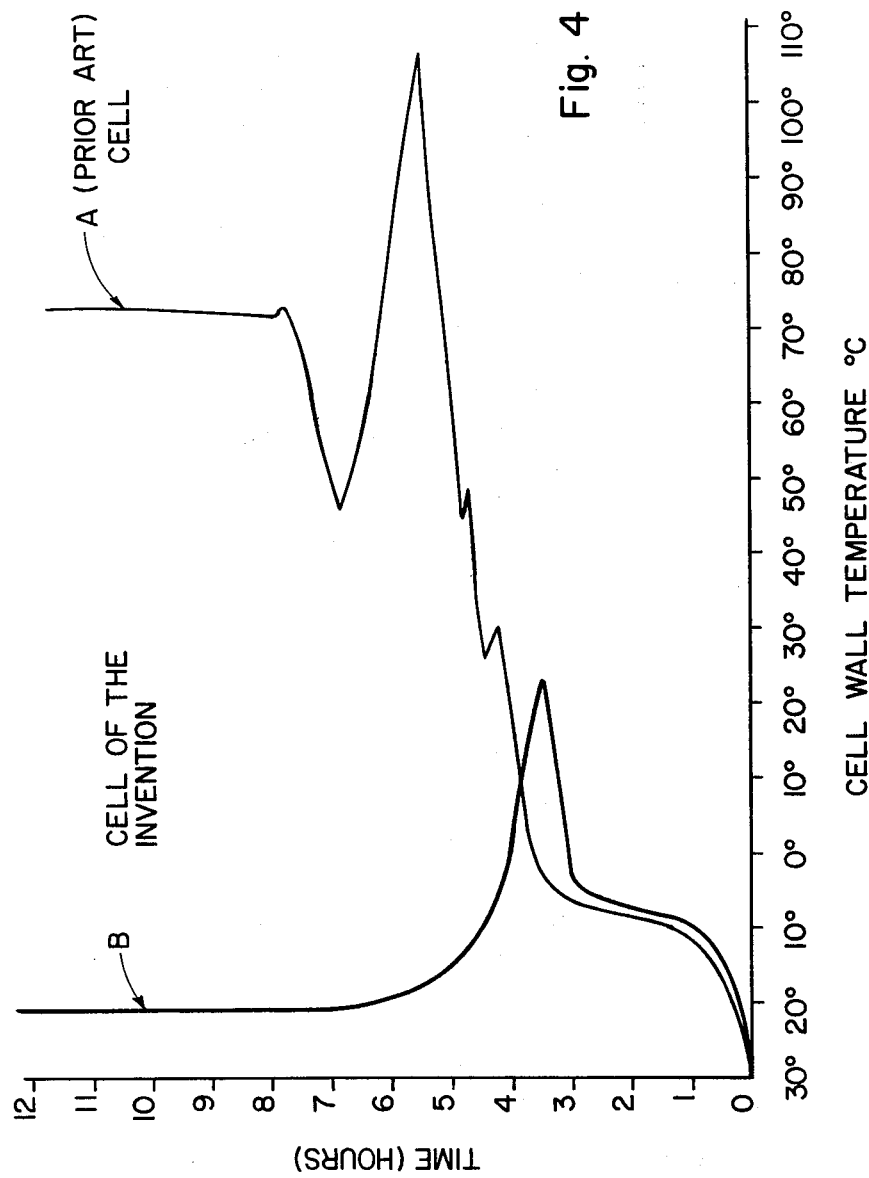
FIG. 4 is a graph of discharge voltage v. time of a prior art cell, and a cell made in accordance with the method of the present invention, as driven into reversal.
Figure 5:
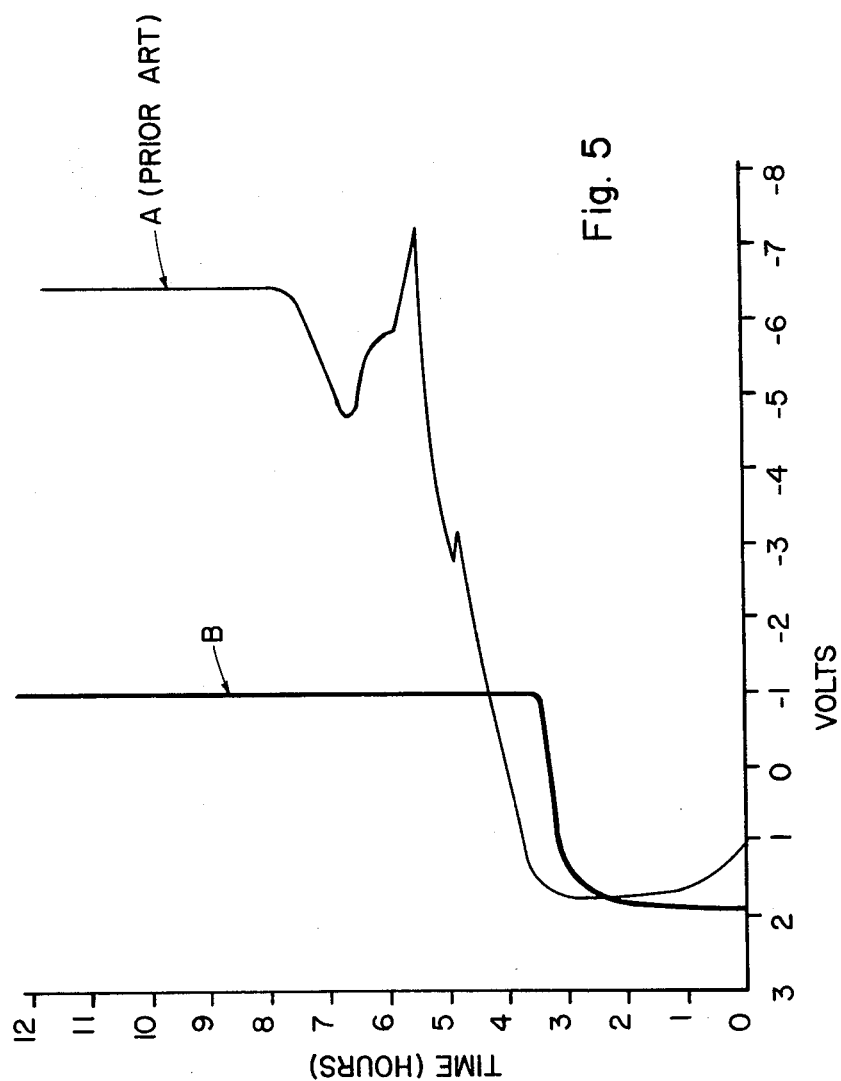
FIG. 5 is a graph of cell call temperature v. time of said prior art and present invention cells.

PATENT NO. : 4,450,213
DATED : May 22, 1984
INVENTOR(S) : Arabinda N. Dey and Robert W. Holmes It is certified that error appears in the above–identified patent and that said Letters Patent are hereby corrected as shown below:

In the drawings change "Fig. 4" to ---Fig. 5--- and change "Fig. 5" to ---Fig. 4---.

Column 4, line 53 change "componets" to ---components---.

Signed and Sealed this

Fifteenth Day of April 1986

[SEAL]

Attest:

DONALD J. QUIGG

Attesting Officer  Commissioner of Patents and Trademarks